United States Patent
Brunken, Jr.

(10) Patent No.: US 8,500,062 B2
(45) Date of Patent: Aug. 6, 2013

(54) ROTOR BLADE SPACING FOR VIBRATION ATTENUATION

(75) Inventor: John E. Brunken, Jr., Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 56 days.

(21) Appl. No.: 13/321,356

(22) PCT Filed: May 22, 2009

(86) PCT No.: PCT/US2009/044955
§ 371 (c)(1), (2), (4) Date: Nov. 18, 2011

(87) PCT Pub. No.: WO2010/134923
PCT Pub. Date: Nov. 25, 2010

(65) Prior Publication Data
US 2012/0061526 A1    Mar. 15, 2012

(51) Int. Cl.
*B64C 27/10* (2006.01)

(52) U.S. Cl.
USPC ............ 244/17.11; 244/7 A; 244/17.21; 244/17.23

(58) Field of Classification Search
USPC ........... 244/7 A, 7 C, 17.11, 17.19, 17.21, 244/17.23; 415/195; 416/203
See application file for complete search history.

(56) References Cited

U.S. PATENT DOCUMENTS

| | | | | |
|---|---|---|---|---|
| 1,868,008 A | * | 7/1932 | Gardner | 416/203 |
| 1,983,606 A | * | 12/1934 | Geise | 165/122 |
| 3,002,711 A | | 10/1961 | Stefano | |
| 3,035,789 A | | 5/1962 | Young | |
| 3,905,565 A | * | 9/1975 | Kolwey | 244/17.23 |
| 3,905,656 A | | 9/1975 | Kolwey | |
| 5,066,195 A | | 11/1991 | Dobrzynski | |
| 5,096,383 A | | 3/1992 | Dobrzynski | |
| 5,306,119 A | * | 4/1994 | Bandoh et al. | 416/168 R |
| 5,381,985 A | | 1/1995 | Wechsler et al. | |
| 5,566,907 A | * | 10/1996 | Marze et al. | 244/17.19 |

(Continued)

FOREIGN PATENT DOCUMENTS

| | | |
|---|---|---|
| CH | 677844 A5 | 6/1991 |
| EP | 2432690 A | 3/2012 |

(Continued)

OTHER PUBLICATIONS

International Search Report and the Written Opinion of the International Searching Authority mailed by ISA/USA, U.S. Patent and Trademark Office on Nov. 13, 2009 for International Patent Application No. PCT/US09/44955, 7 pages.

(Continued)

*Primary Examiner* — Timothy D Collins
*Assistant Examiner* — Michael Kreiner
(74) *Attorney, Agent, or Firm* — James E. Walton; J. Oliver Williams

(57) ABSTRACT

A rotor system for a rotorcraft, the rotor system is a rotor hub having six rotor blades attached to a rotor mast via a rotor yoke assembly. Each rotor blade is angularly spaced in 30° and 90° alternating angular increment about a mast axis of rotation. Such rotor blades spacing reduces the vibration that is translated into the rotorcraft through the rotor mast.

13 Claims, 3 Drawing Sheets

U.S. PATENT DOCUMENTS

| | | | |
|---|---|---|---|
| 5,634,611 A * | 6/1997 | Marze et al. | 244/17.19 |
| 6,695,106 B2 | 2/2004 | Smith et al. | |
| 7,264,199 B2 | 9/2007 | Zientek | |
| 2005/0067527 A1 | 3/2005 | Petersen | |
| 2006/0011777 A1 | 1/2006 | Arlton et al. | |
| 2007/0158494 A1 | 7/2007 | Burrage | |
| 2007/0181742 A1 | 8/2007 | Van de Rostyne et al. | |

FOREIGN PATENT DOCUMENTS

| | | | |
|---|---|---|---|
| FR | 1316302 A | 1/1963 | |
| GB | 2409845 A | 7/2005 | |
| WO | 2010134920 A1 | 11/2010 | |
| WO | 2010134921 A1 | 11/2010 | |

OTHER PUBLICATIONS

Extended European Search Report from related Application 09845035.6-2422 issued by the European Patent Office dated Apr. 18, 2012.

International Preliminary Report on Patentability of the International Preliminary Examining Authority mailed by IPEA/USA, U.S. Patent and Trademark Office on Dec. 12, 2011 for related International Patent Application No. PCT/US09/44895, 6 pages.

Extended European Search Report mailed from the European Patent Office Mar. 21, 2012 from related European Patent Application No. 09845032.3-1254, 5 pages.

International Search Report and the Written Opinion of the International Searching Authority mailed by ISA/USA, U.S. Patent and Trademark Office on Jul. 14, 2009 for related International Patent Application No. PCT/US09/44895, 8 pages.

International Search Report and the Written Opinion of the International Searching Authority mailed by ISA/USA, U.S. Patent and Trademark Office on Jul. 14, 2009 for related International Patent Application No. PCT/US09/44963, 9 pages.

International Preliminary Examination Report mailed by IPEA/USA, U.S. Patent and Trademark Office on Oct. 11, 2011 for related International Patent Application No. PCT/US09/44963, 8 pages.

Examination Report from European Patent Office in related European Patent Application No. 09845035, mailed Nov. 27, 2012, 6 pages.

International Preliminary Report on Patentability of the International Preliminary Examining Authority mailed by IPEA/USA, U.S. Patent and Trademark Office on Jul. 13, 2012 for International Patent Application No. PCT/US09/44955, 7 pages.

Extended European Search Report from European Patent Office in related European Patent Application No. 09845034, mailed Sep. 14, 2012, 6 pages.

Examination Report from European Patent Office in related European Patent Application No. 09845034, mailed Apr. 25, 2013, 3 pages.

* cited by examiner

ROTOR BLADE SPACING FOR VIBRATION ATTENUATION

TECHNICAL FIELD

The present application relates in general to the field of rotor systems for rotorcraft.

DESCRIPTION OF THE PRIOR ART

There are many different types of rotorcraft, including helicopters, tandem rotor helicopters, tiltrotor aircraft, four-rotor tiltrotor aircraft, tilt wing aircraft, and tail sitter aircraft. In all of these rotorcraft, thrust and/or lift is generated by air flowing through a rotor disk formed by a plurality of rotating rotor blades. Typically, the plurality of rotor blades are mechanically coupled with and substantially evenly spaced about a rotatable mast, which provides rotational motion to the plurality of rotor blades.

FIG. 1 depicts a military tiltrotor aircraft 101 with conventional rotor hubs 107a and 107b. Rotor hubs 107a and 107b are mechanically coupled to nacelles 103a and 103b, respectively. Nacelles 103a and 103b are rotably attached to wing members 105a and 105b, respectively. Wing members 105a and 105b are rigidly fixed to fuselage 109. Rotor hubs 107a and 107b have a plurality of rotor blades 111a and 111b, respectively. The tiltrotor aircraft 101 of FIG. 1 is depicted in helicopter mode, with nacelles 103a and 103b directed up.

FIG. 2 depicts a commercial tiltrotor aircraft 201 with conventional rotor hubs 207a and 207b. Rotor hubs 207a and 207b are mechanically coupled to nacelles 203a and 203b, respectively. Nacelles 203a and 203b are rotably attached to wing members 205a and 205b, respectively. Wing members 205a and 205b are rigidly fixed to fuselage 209. Rotor hubs 207a and 207b have a plurality of rotor blades 211a and 211b, respectively. FIG. 2 depicts tiltrotor aircraft 201 in airplane mode, with nacelles 203a and 203b directed forward.

It is often desirable to utilize a greater number of rotor blades in the rotor system, rather than a fewer number, to increase lift and/or thrust of a rotorcraft. It is also desirable to minimize the vibration generated in the rotor system. Vibrations that originate in the rotor system translate down the rotor mast and into the fuselage of the aircraft. There have been many attempts to reduce such vibration, many of which use costly vibration eliminators, as well as complex hinges with dampeners.

There are many rotorcraft rotor systems well known in the art; however, considerable room for improvement remains.

BRIEF DESCRIPTION OF THE DRAWINGS

The novel features believed characteristic of the system of the present application are set forth in the appended claims. However, the system itself, as well as, a preferred mode of use, and further objectives and advantages thereof, will best be understood by reference to the following detailed description when read in conjunction with the accompanying drawings, wherein:

Figure 1:
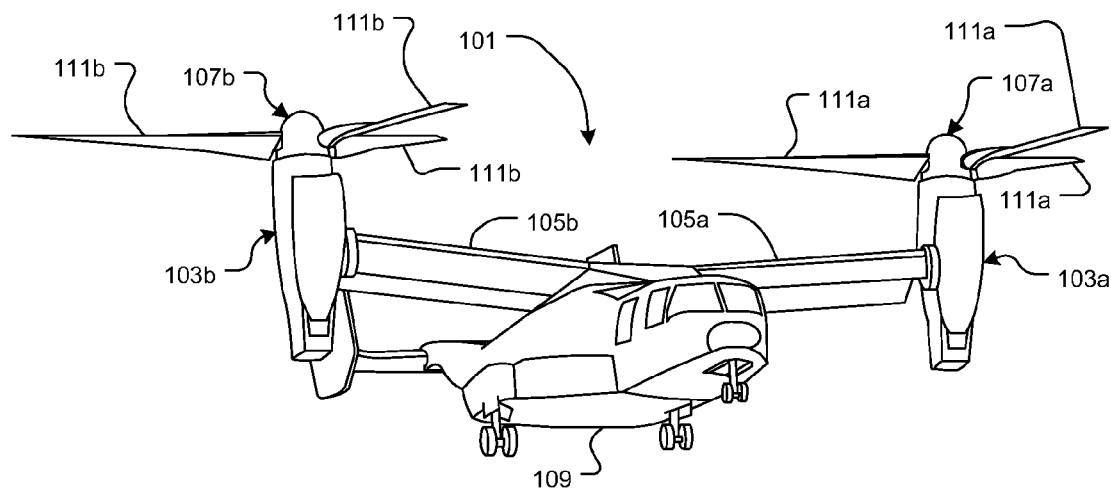
FIG. 1 is a perspective view of a prior art tiltrotor aircraft in helicopter mode.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application represents a rotor system for a rotorcraft and a rotorcraft incorporating the rotor system. The rotor system includes a rotor hub having six rotor blades. The six rotor blades are angularly spaced in 30° and 90° alternating increments about a mast axis of rotation. In the preferred embodiment, three of the rotor blades are located in an upper plane, and the other three rotor blades are located in a lower plane. In an alternative embodiment, all of the six rotor blades are located in a single plane transverse to the mast axis.

Figure 3:
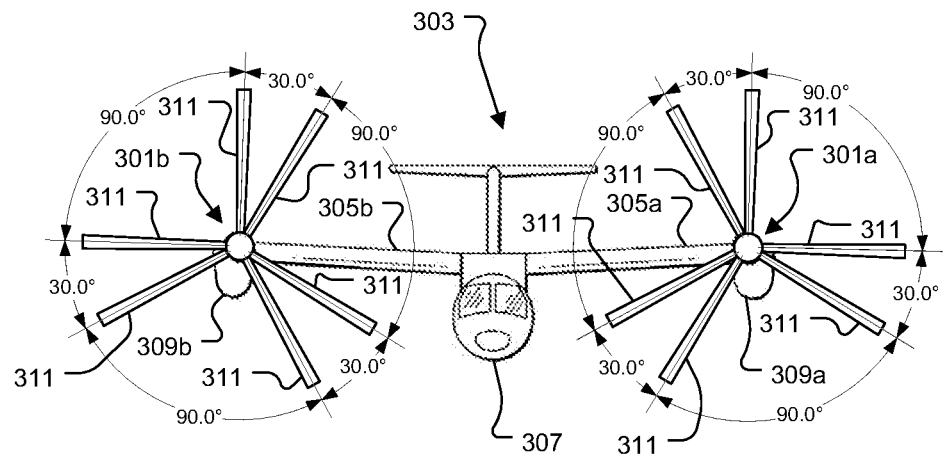
FIG. 3 is a front view of a tiltrotor aircraft, in airplane mode, having a rotor hub according the preferred embodiment of the present application.
Figure 4:
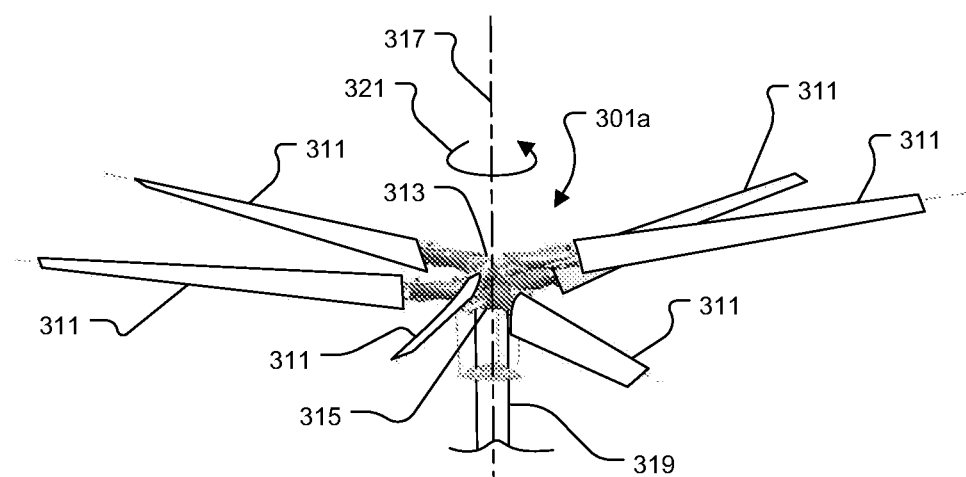
FIG. 4 is a perspective view of a rotor hub from the aircraft in FIG. 3, according to the preferred embodiment of the present application.

Referring now to FIGS. 3 and 4 in the drawings, FIG. 3 is a front view of a rotorcraft 303, while in airplane mode. FIG. 4 is a perspective view of a rotor hub 301a from rotorcraft 303. Rotor hub 301a is mechanically coupled to a nacelle 309a. Similarly, a rotor hub 301b is mechanically coupled to a nacelle 309b. Nacelles 309a and 309b are pivotally attached to wing members 305a and 305b. Wing members 305a and 305b are rigidly attached to a fuselage 307. Nacelles 309a and 309b are configured to pivotally rotate relative to wing members 305a and 305b between a helicopter mode, in which nacelles 309a and 309b are tilted upward such that rotorcraft 303 flies like a conventional helicopter; and an airplane mode in which nacelles 309a and 309b are tilted forward such that rotorcraft 303 flies similar to a conventional propeller-driven airplane. It should be noted that, while rotorcraft 303 is depicted in FIG. 3 as being a tiltrotor rotorcraft, the scope of the system of the present application is not so limited. Rather, the system of the present application contemplates rotorcraft 303 being any type of rotorcraft, such as a helicopter, a tandem rotor helicopter, a tiltrotor aircraft, a four-rotor tiltrotor aircraft, a tilt wing aircraft, or a tail sitter aircraft.

Figure 2:
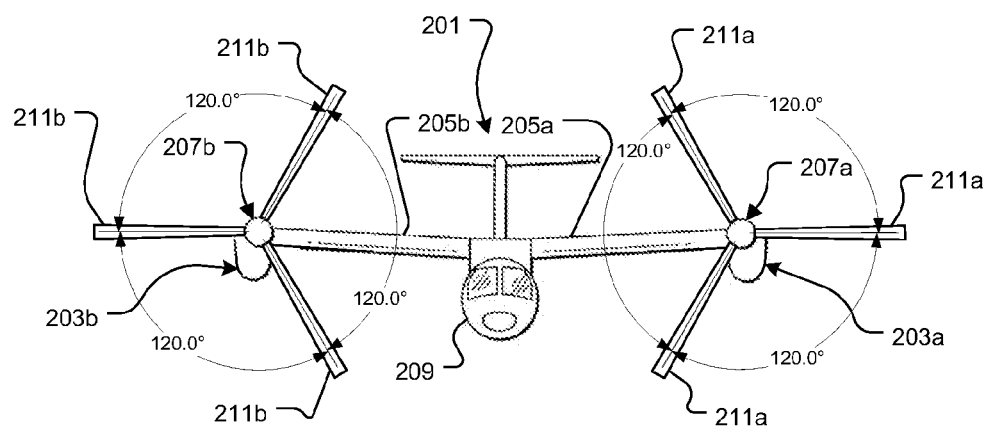
FIG. 2 is a front view of a prior art tiltrotor aircraft in airplane mode.

Still referring to FIGS. 3 and 4, angular spacing of six rotor blades 311, in rotor hub 301a, is in contrast to the uniform angular spacing of rotor blades in aircrafts 101 and 201 of FIGS. 1 and 2, respectively. Six rotor blades 311 are angularly spaced in 30° and 90° alternating angular increments about a mast axis of rotation 317. Six rotor blades 311 angularly spaced in 30° and 90° alternating angular increments about mast axis of rotation 317, results in azimuth positions of 0°, 30°, 120°, 150°, 240°, and 270°, as measured from a single rotor blade 311. In the preferred embodiment, three rotor blades 311 are attached to an upper rotor yoke assembly 313, while the remaining three rotor blades 311 are attached to a lower rotor yoke assembly 315. Three rotor blades 311 of upper rotor yoke assembly 313 are spaced in 120° increments. Similarly, three rotor blades 311 of lower rotor yoke assembly 315 are spaced in 120° increments. Lower rotor yoke assembly 315 is clocked forward 30° in relation to upper rotor yoke assembly 313, resulting in all six rotor blades 311 being angularly spaced in 30° and 90° alternating angular increments about mast axis of rotation 317. In rotor hub 301a, upper rotor yoke assembly 313 and lower rotor yoke assembly 315 are attached to rotor mast 319 and rotate in a counter clockwise direction 321 about mast axis of rotation 317. Rotor hub 301b is a symmetrical version of rotor hub 301a, as such being configured to rotate in the opposite direction of rotor hub 301a. Having rotor hubs 301a and 301b rotate in opposite directions prevents rotorcraft 303 from needing of an anti-torque device, such as a tailrotor. Upper rotor yoke assembly 313 and lower rotor yoke assembly 315 are shown in simplified form, but in reality are a complicated assembly of structures designed to operably attach rotor blades 311 to rotor mast 319.

Typically, the operation of a rotor hub on a rotorcraft generates vibrations from blade collective mode response which transmit into a rotor mast, and further into aircraft structure, such as wing members 305a and 305b, and fuselage 307. The vibrations can be characterized as an n/rev vibratory mode, where "n" is the number of rotor blades, and "rev" stands for revolutions. For example, a rotorcraft having four equally spaced rotor blades would produce a primary vibratory mode of 4/rev. Another example is a rotorcraft having six equally spaced rotor blades would produce a primary vibratory mode of 6/rev. As such, the rotorcraft design has to account for the vibratory mode in order to function properly and safely. Much time and energy must be spent to ensure the rotorcraft structure and equipment is designed to withstand the vibratory mode. An alternative to designing heavy structure and equipment to withstand the vibratory mode, is to attempt to attenuate or dampen the vibration with sophisticated, expensive, and heavy devices within the rotorcraft.

Rotor hubs 301a and 301b of the preferred embodiment have unique rotor blade 311 spacing configured to eliminate a significant portion of vibratory mode, which would otherwise be generated on a prior art rotor hub. As shown below, the unique spacing of rotor blades 311 in rotor hubs 301a and 301b, eliminates the 6/rev vibratory mode that would typically exist in prior art six bladed rotor systems. Because of the unique alternating 30° and 90° angular spacing of rotor blades 311, some 3/rev vibratory mode may be generated when analyzing as the six rotor blades 311 as three rotor blade pairs. However, as shown below, the 3/rev vibratory mode is half of the amount of 3/rev vibration that would be produced in an equally spaced three bladed rotor system of equal performance to the 6 bladed configuration of rotor hubs 301a and 301b.

The cancelation of vibratory forces at the rotor hubs 301a and 301b, as well as a rotor hub 501, may be calculated with the following basic equation:

$$W_{HUB} = \sum_{i=1}^{6} \left(\frac{1}{n}W\right)\cos(np\psi_i)$$

In the above equation, $W_{HUB}$ represents the total work done at rotor hub 301a. W represents the scalar sum of work done by rotor blades 311, where n is the number of blades, and np is the harmonic order. $\psi$ represents the azimuth position of each rotor blade 311, each azimuth position being consistently measured from a single rotor blade 311. For example, calculating the 6/rev vibratory mode as a function of total work done ($W_{HUB}$) for rotor hub 301a would be as follows:

$$W_{HUB} = \left(\frac{1}{6}W\right)\cos(6\times 0°) + \left(\frac{1}{6}W\right)\cos(6\times 30°) + \left(\frac{1}{6}W\right)\cos(6\times 120°) + \\ \left(\frac{1}{6}W\right)\cos(6\times 150°) + \left(\frac{1}{6}W\right)\cos(6\times 240°) + \left(\frac{1}{6}W\right)\cos(6\times 270°)$$

Which becomes:

$$W_{HUB} = \left(\frac{1}{6}W\right)(+1) + \left(\frac{1}{6}W\right)(-1) + \\ \left(\frac{1}{6}W\right)(+1) + \left(\frac{1}{6}W\right)(-1) + \left(\frac{1}{6}W\right)(+1) + \left(\frac{1}{6}W\right)(-1)$$

Which gives the result:

$W_{HUB} = 0$

As shown, the total work done at rotor hub 301a for 6/rev vibratory mode is equal to zero. This means that no 6/rev vibratory mode forces are translated down mast 319 into aircraft structure.

However, the 30°/90° rotor blade configuration (see FIGS. 3-6) still experiences some 3/rev vibratory mode, as explained previously, the same basic equation can be used to calculate the total work done at rotor hub 301a for the 3/rev vibratory mode. For example, calculating the 3/rev vibratory mode as a function of total work done at rotor hub 301a would be as follows:

$$W_{HUB} = \left(\frac{1}{6}W\right)\cos(3\times 0°) + \left(\frac{1}{6}W\right)\cos(3\times 30°) + \left(\frac{1}{6}W\right)\cos(3\times 120°) +$$

-continued $$\left(\frac{1}{6}W\right)\cos(3\times 150°)+\left(\frac{1}{6}W\right)\cos(3\times 240°)+\left(\frac{1}{6}W\right)\cos(3\times 270°)$$

Which becomes:

$$W_{HUB} = \left(\frac{1}{6}W\right)(+1)+\left(\frac{1}{6}W\right)(0)+\left(\frac{1}{6}W\right)(+1)+\left(\frac{1}{6}W\right)(0)+\left(\frac{1}{6}W\right)(+1)+\left(\frac{1}{6}W\right)(0)$$

Which gives the result:

$$W_{HUB} = \frac{1}{2}W$$

It is important to note that for a conventional three bladed rotor hub having symmetrically spaced rotor blades of 120° angular spacing, the total work on the rotor hub for the 3/rev vibratory mode would be:

$$W_{HUB} = \left(\frac{1}{3}W\right)(+1)+\left(\frac{1}{3}W\right)(+1)+\left(\frac{1}{3}W\right)(+1)$$

Which gives the result:

$W_{HUB} = 1$ W

Therefore, the blade spacing configuration of rotor hubs 301a, 301b, and 501, cancels out the 6/rev vibratory mode. The 3/rev vibratory mode is reduced to half of the amount of 3/rev vibration that would be produced in an equally spaced three bladed rotor system of equal performance to the 6 bladed configurations of rotor hubs 301a, 301b, and 501.

Figure 5:
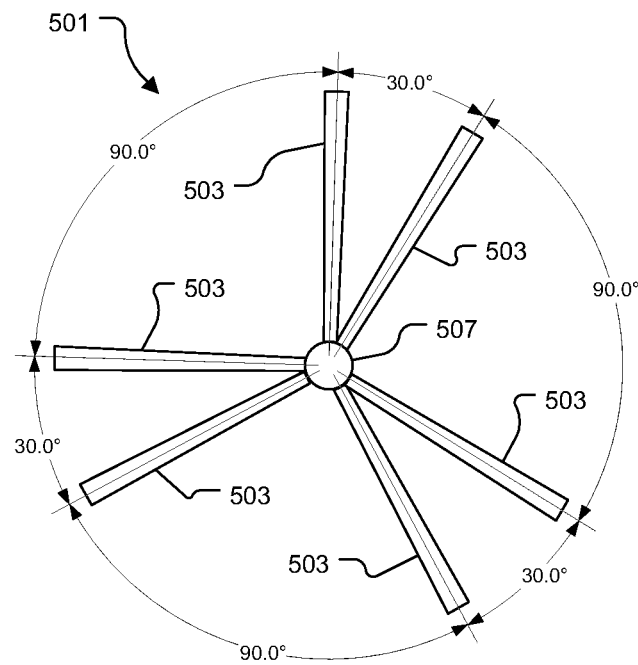
FIG. 5 is a view looking normal to a rotor hub, according to an alternative embodiment of the present application.
Figure 6:
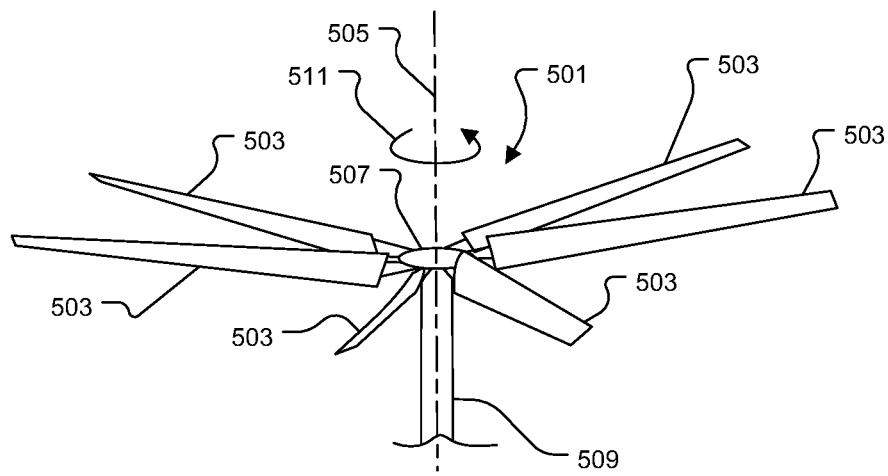
FIG. 6 is a perspective view of a rotor hub from FIG. 5, according to an alternative embodiment of the present application.

Referring now to FIGS. 5 and 6 in the drawings, FIG. 5 is view looking normal to rotor hub 501 according to an alternative embodiment of the present application. Rotor hub 501 is similar to rotor hub 301a, but a primary distinguishing feature is that rotor blades 503 are located in a singular plane transverse to a mast axis of rotation 505, as shown in FIG. 6. The previously discussed vibration cancellation due to rotor blade spacing of rotor hub 301a and 301b applies equally to rotor hub 501.

Still referring to FIGS. 5 and 6, Angular spacing of six rotor blades 503, in rotor hub 501, is in contrast to the uniform angular spacing of aircrafts 101 and 201 of FIGS. 1 and 2, respectively. Six rotor blades 503 are angularly spaced in 30° and 90° alternating angular increments about mast axis of rotation 505. Six rotor blades 503 angularly spaced in 30° and 90° alternating angular increments about mast axis of rotation 505, results in azimuth positions of 0°, 30°, 120°, 150°, 240°, and 270°, as measured consistently from any single rotor blade 503. In this alternative embodiment, all six rotor blades 503 are attached to a rotor mast 509 and rotate in a counter clockwise direction 511 about mast axis of rotation 505. Rotor blades 503 are coupled to a rotor yoke assembly 507 and located in a single plane transverse to mast axis of rotation 505. Rotor yoke assembly 507 is shown in simplified form, but in reality, rotor yoke assembly 507 is a complicated assembly of structures designed to operably attach rotor blades 503 to rotor mast 509. It should be appreciated that rotorcraft 303 may be configured with rotor hub 501, in place of rotor hub 301a. Similarly, rotorcraft 303 may be configured with a symmetric version of rotor hub 501, in place of rotor hub 301b. Such a symmetric version of rotor hub 501 is configured to rotate in a clockwise direction.

The system of the present application provides significant advantages, including: (1) providing a way to utilize a plurality of rotor blades in a rotorcraft while reducing the vibratory load on the rotorcraft; (2) reducing vibratory loads experienced on a rotorcraft, thereby improving the life and reliability of installed equipment; (3) reducing vibratory loads experienced on a rotorcraft, thereby improving occupant comfort; and (4) reducing vibratory loads experienced on a rotorcraft, thereby enabling the structural components to be lighter, which in turn improves rotorcraft performance.

It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A rotor system for a rotorcraft, comprising:
a rotor hub having six rotor blades;
wherein each rotor blade is angularly spaced in 30° and 90° alternating angular increments about a mast axis of rotation for vibration attenuation.

2. The rotor system according to claim 1, wherein the rotor blades rotate in a single direction about the mast axis of rotation.

3. The rotor system according to claim 1, wherein the rotor blades are located in a single plane transverse to the mast axis of rotation.

4. The rotor system according to claim 3, wherein the rotor blades are attached to a rotor mast via a rotor yoke assembly.

5. The rotor system according to claim 1, wherein three of the rotor blades are located in an upper plane while the remaining three rotor blades are located in a lower plane, each plane being transverse to the mast axis of rotation.

6. The rotor system according to claim 5, wherein the three rotor blades located in the upper plane are attached to a rotor mast via an upper rotor yoke assembly, while each of the three rotor blades located in the lower plane are attached to the rotor mast via a lower rotor yoke assembly.

7. A rotorcraft, comprising:
a fuselage; and
a rotor hub having six rotor blades;
wherein each rotor blade is angularly spaced in 30° and 90° alternating angular increments about a mast axis of rotation for vibration attenuation.

8. The rotorcraft according to claim 7, wherein the rotor blades rotate in a single direction about the mast axis of rotation.

9. The rotorcraft according to claim 7, wherein the rotor blades are located in a single plane transverse to the mast axis of rotation.

10. The rotorcraft according to claim 9, wherein the rotor blades are attached to a rotor mast via a rotor yoke assembly.

11. The rotorcraft according to claim 7, wherein three of the rotor blades are located in an upper plane while the remaining three rotor blades are located in a lower plane, each plane being transverse to the mast axis of rotation.

12. The rotorcraft according to claim 11, wherein the three rotor blades located in the upper plane are attached to a rotor mast via an upper rotor yoke assembly, while each of the three rotor blades located in the lower plane are attached to the rotor mast via a lower rotor yoke assembly.

13. The rotorcraft according to claim 7, wherein the rotorcraft is at least one of a helicopter, a tandem rotor helicopter, a tiltrotor aircraft, a four-rotor tiltrotor aircraft, a tilt wing aircraft, and a tail sitter aircraft.

* * * * *